Dec. 11, 1973  R. POSNER  3,778,323
METHOD OF MAKING A MOLD SECTION
Filed June 14, 1971

United States Patent Office 3,778,323
Patented Dec. 11, 1973

3,778,323
METHOD OF MAKING A MOLD SECTION
Richard Posner, East Northport, N.Y., assignor to Creative Polymer Products Corp., Long Island City, N.Y.
Continuation-in-part of application Ser. No. 784,998, Nov. 25, 1968, now Patent No. 3,600,489. This application June 14, 1971, Ser. No. 152,810
The portion of the term of the patent subsequent to Aug. 16, 1988, has been disclaimed
Int. Cl. B29c 1/04; B32b 31/00
U.S. Cl. 156—212                              8 Claims

ABSTRACT OF THE DISCLOSURE

A mold section is made by covering one surface of a slab of polymerizable material which flows under pressure with a sheet of plastic barrier material. A pattern is then placed on this so-covered surface. A compressive force and heat are applied to the slab which is then polymerized with the sheet bonded thereto.

---

This invention pertains to the making of molds and more particularly to the making of molds for casting plastics and the like and is a continuation-in-part of my copending application, Ser. No. 784,998, filed Nov. 25, 1968 and now U.S. Pat. 3,600,489 issued Aug. 17, 1971.

Present molds for casting plastics are either made from steel which is hand engraved or from bronze castings. Such molds, by the very nature of fabrication, are very expensive and take a considerable time to make.

In order to amortize the fabrication costs, the mold must be used for large runs or the cost per finished product must be high. Therefore, such molds have limited applications. In order to broaden the field of use, cheaper molds are required.

It is, accordingly, a general object of the invention to provide an improved method of making mold sections.

It is another object of the invention to provide an improved method of making mold sections for casting plastics.

It is a further object of the invention to provide a method of making mold sections with non-sticking barrier surfaces.

It is yet another object of the invention to provide a method of making mold sections which saves considerable time and money when compared with presently available methods.

Briefly, the invention contemplates a method of making a mold selection for an object by applying a heat activatable bonding agent to at least either one surface of a slab of polymerizable material which is flowable before polymerization or to an etched surface of a sheet of homogeneous plastic material, and then placing the sheet on the slab so that such surfaces abut. Thereafter, a pattern of the object is placed on the exposed surface of the sheet. Initially, a compressive force is applied to the slab, sheet and model at a temperature below the temperature for activating the heat activatable bonding agent and polymerizing the slab for a period of time to permit the sheet and slab to cold flow to their final surface contours whereby the sheet and slab are deformed to conform to the pattern. Thereafter, there is applied heat with sufficient temperature to activate the heat activatable bonding agent and polymerize the slab.

Other objects, features and the advantages of the invention will be apparent from the following detailed description when read with the accompanying drawing which illustrates steps for practicing the invention.

Figure 1:
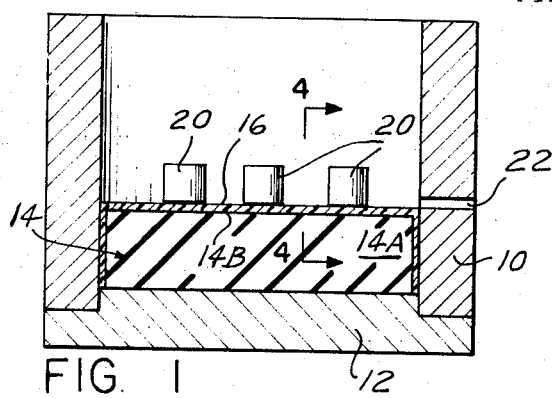
FIGS. 1, 2 and 3 show, in section, the steps of making a mold section by placing a slab of polymerizable mold material having one surface covered with a sheet of plastic barrier material in a retainer ring.
Figure 2:
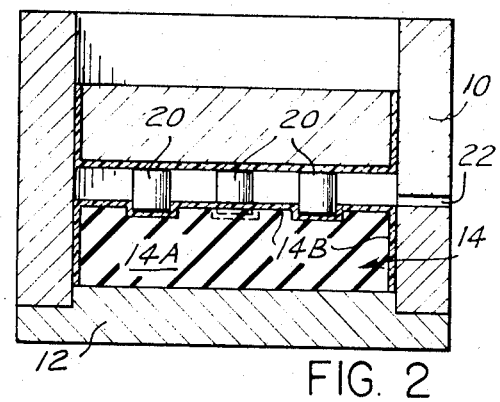
Figure 3:
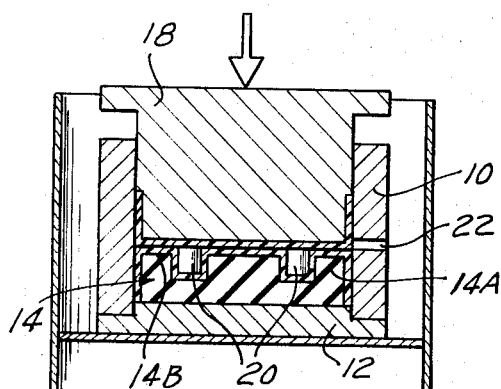

In FIG. 1, there is shown a retainer ring 10 in the form of a hollow cylinder of metal with a bottom plate 12 of the same metal which acts as a pressure base sealer. Within the cavity, so defined, is placed a mold blank 14 comprising at least one circular slab 14A of a preformed polymerizable type material which is flowable under at least pressure. Such materials can be either elastometric or not. If the materials are elastomeric they can be, for example, natural rubbers, elastomeric-type rubbers such as Viton, neoprene or any such synthetic rubber in an unvulcanized or unpolymerized state. If the materials are not elastometric, they can be Sheet Molding Compound (SMC), a polymerizable polyester made by the Marco Division of W. R. Grace Co. It should be noted that the type of mold to be made can dictate a choice of materials.

Because the particular plastic which is to be cast by the mold can cause sticking to the mold or can chemically attack the mold section, the mold section is permanently lined with a film or sheet 14B which acts as a barrier layer. Typical films can be Teflon (tetrafluoroethylene or a copolymer of tetrafluoroethylene and hexafluoropropylene), nylon, polyvinyl chloride or polyvinyl fluoride, etc.

Figure 4:
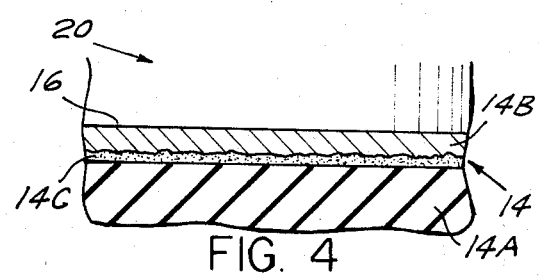
FIG. 4 is an enlarged cross-sectional view of a portion of the slab of mold material with its top surface covered with a sheet of plastic barrier material in accordance with the invention.
Figure 5:
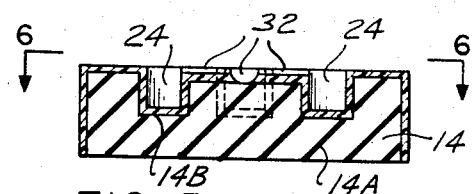
FIG. 5 is a cross-sectional view of the finished mold section.

Therefore, the circular slab 14A is lined with the sheet 14B prior to its insertion in the retainer ring. In FIG. 4, there is shown such an assemblage. Either the back of sheet 14B or the top and sides of slab 14A and preferably both are coated with a bonding agent which is activated by at least heat. Typical bonding agents are Chemlock 220 and Chemlock 234 made by Hughson Chemical Company of Erie, Pa. The barrier film is sheet Teflon or the like, whose surface which will contact the slab 14A is etched either mechanically, chemically or by other means. Materials such as ACLAR made by Allied Chemical Co., KEL–F made by Minnesota Mining and Manufacturing Co., require a mechanical or chemical etching. However, Teflon-FEP grade (a copolymer of tetrafluoroethylene and hexafluoropropylene) manufactured by Du Pont is "etched" during its manufacture and does not require the usual mechanical or chemical etching.

After the mold blank 14 is placed in the cavity, patterns 20 are placed on the top surface 16. If the molds are to be used in a centrifugal molding operation, the patterns are preferably placed along a radii of the slab and spaced from the center to have dynamic balance.

Next, a positive pressure by means of piston 18 is applied to the patterns 20 and mold blank 14. When the barrier film is Teflon or the like, the pressure can first be applied without heating so that the slab material and the Teflon can "cold flow" to the desired contours. However, preferably heat is applied as long as the temperature is below the activation temperature of the bonding agent. Then heat is applied to the retainer ring assemblage. The polymerizable material softens and flows occupying all voids with any air existing from port 28. The positive pressure is applied during the heating and cooling cycle to minimize any shrinkage. It should be noted that the polymerizing time, temperature and pressure are determined by the type of material used and such parameters are well known.

Figure 6:
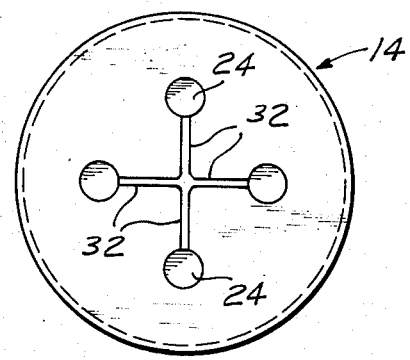
FIG. 6 shows a top view of one of the mold sections with runners therein.

Thereafter, the heat and pressure source is opened and the slab and the patterns are removed. Then runners 32 are cut into slab 14. FIG. 6). It should be noted that although the runners are cut into the slab, they could equally well have been formed by using patterns just as the patterns 20 were used to form the mold cavities 24.

Figure 7:
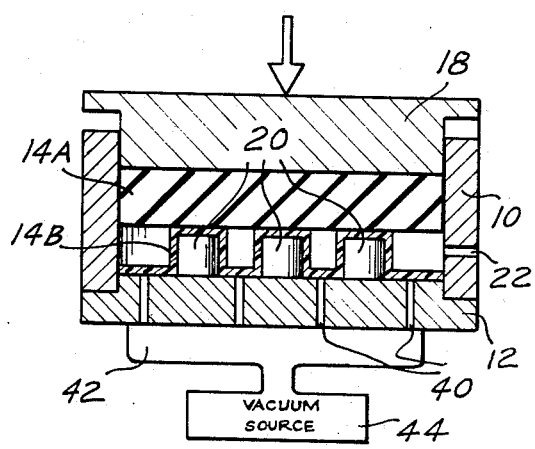
FIG. 7 shows apparatus for a variation of the invention.

If deep draws are required for the mold, it is desirable to preform the sheet which acts as the barrier layer. FIG. 7 shows the making of a mold section with a preformed sheet. Since most of the elements are the same as those of FIGS. 1 to 6, the same reference numerals will be used for like elements.

In particular, the models 20 are placed on bottom plate 12 which includes fine vents 40 connected via manifold 42 to a vacuum source 44. The sheet 14B is then placed over the models 20 and base plate 12. Heat from a source (not shown) is applied to the sheet 14B. When the sheet is softened the vacuum is applied to suck the sheet 14B about the models 20. Thereafter, or even before, the application of the vacuum slab 14A is placed on the sheet 14A as shown in FIG. 7. Again, heat is applied to cause the material of slab 14A to soften and the compression force is applied to force the material to flow to fill the contours. Thereafter, sufficient heat is applied to polymerize the slab and activate the bonding agent. In this embodiment, at least one and preferably both of the abutting surfaces of the slab and sheet are coated with the above-described bonding agent. Therefore, care should be taken that the temperature of the assemblage be kept below the activating temperature of the bonding agent until the final vulcanizing step.

If the mold section is to be used in injection molding operations it is necessary to controllably heat and cool the mold. In such case, one can incorporate electrical resistance wires or the like in the slab so that these wires can be connected to a power source to supply heat to the mold during subsequent injection molding operations. Alternately, one can include ducts in the slab which are then used as conduits for hot or cold water as required during the subsequent injection molding operations.

Furthermore, it has been found that for certain types of molds and materials one need not use a bonding agent but need only apply sufficient heat and pressure and the sheet will adhere at least temporarily to the slab. However, for most mold sections it is desirable to use the heat activatable bonding agent as described above.

There has thus been shown a process for making mold sections extremely rapidly and inexpensively as compared to conventional molds. The mold sections, according to the invention, can be used for polymerizable plastics and the like, using injection and compression molding techniques.

There will now be obvious to those skilled in the art many modifications and variations satisfying many or all of the objects of the invention but which do not depart from the spirit thereof as defined by the appended claims.

What is claimed is:

1. The method of making a mold section for an object comprising the steps of abutting a pre-etched surface of a sheet of homogeneous plastic material which is flowable against one surface of a slab of polymerizable material which is flowable before polymerization, said pre-etched surface and said one surface of said slab being initially coated with a heat activatable bonding agent, abutting a pattern of the object with the exposed surface of said sheet, initially applying a compressive force to said slab and said sheet at a first temperature below the temperature for polymerizing said slab and the temperature for activating said heat activatable bonding agent for a period of time to permit said sheet and said slab to cold flow to their final surface contours whereby said sheet and said slab are deformed to conform to said pattern and thereafter applying heat with sufficient temperature to activate said heat activatable bonding agent to cause said sheet to adhere to said slab and to polymerize said slab.

2. The method of claim 1 wherein said sheet of homogeneous plastic material consists of tetrafluoroethylene or a copolymer of tetrafluoroethylene and hexafluoropropylene.

3. The method of claim 2 wherein said sheet of homogeneous plastic material is a copolymer of tetrafluoroethylene and hexafluoropropylene.

4. The method of claim 2 wherein said sheet of homogeneous plastic material is tetrafluoroethylene.

5. The method of claim 1 wherein said sheet of homogeneous plastic material is initially at least partially preformed to the shape of the models before abutting to said slab.

6. The method of claim 5 wherein said preforming is a vacuum forming step.

7. The method of claim 1 wherein said slab of polymerizable material includes electrical conductors inserted therein.

8. The method of claim 1 wherein said slab of polymerizable material is an elastomer.

References Cited

UNITED STATES PATENTS

| | | | |
|---|---|---|---|
| 3,703,572 | 10/1972 | Bellasalma | 264—220 X R |
| 3,532,587 | 10/1970 | Ungar et al. | 425—175 X R |
| 2,626,337 | 1/1953 | Mitchell | 156—196 |
| 2,714,226 | 8/1955 | Axelrad | 264—337 |
| 2,796,634 | 6/1957 | Chellis | 156—196 |
| 3,183,289 | 5/1965 | Leavesley, Jr. | 425—175 |
| 3,420,733 | 1/1969 | Ochi et al. | 156—245 |

ALFRED L. LEAVITT, Primary Examiner

B. J. LEWRIS, Assistant Examiner

U.S. Cl. X.R.

156—196, 242, 285, 289; 264—220